United States Patent Office 2,909,441
Patented Oct. 20, 1959

2,909,441

COATING COMPOSITION OF ASPHALTENES AND PLASTICIZER

Marion W. Pickell, Bartlesville, Okla., assignor to Kerr-McGee Oil Industries, Inc., a corporation of Delaware No Drawing. Application January 15, 1957
Serial No. 634,175

28 Claims. (Cl. 106—123)

This invention relates to new and useful coating compositions of the type generally referred to as thick protective coatings and intended to be applied by methods such as spraying and troweling.

This application is a continuation-in-part of my application Serial Number 455,798, filed September 13, 1954, for Protective Coating Compositions, now abandoned.

There are few prior art coating compositions which combine the highly desired characteristics of low raw material cost and ease of applicability to form a relatively thick coating and at the same time are also highly resistant to acid and alkali materials, non-corrosive toward the surface upon which they are applied, weather-resistant, possess a high degree of toughness and flexibility even at low temperatures, fire and heat resistant, and possess excellent bonding properties to the many types of surfaces to which they are applied for protective reasons.

There is, however, one composition which possesses all of these properties to a certain degree. This composition is one containing Gilsonite as a principal constituent along with a filler and solvent in proper proportions to obtain the required degree of spreadability.

Gilsonite is one of the purest natural bitumens available but its sole source in commercial quantities in this country is two counties in the State of Utah. Gilsonite as mined in these counties varies in its properties from one deposit to another and its properties often vary within a given deposit. In addition, many of the more accessible deposits are being depleted. Consequently, the industry is faced with the problem of providing a suitable replacement material for Gilsonite in such compositions.

Accordingly, it is an important object of the present invention to provide a coating composition of the relatively thick protective type which is at least equally as good as similar compositions containing Gilsonite as an essential constitutent thereof.

A further object of the present invention is to provide a coating composition of the aforesaid type containing materials whose properties are uniform in specification, thereby assuring duplication of properties of these compositions.

A still further important object of the present invention is to provide a coating composition whose constituents may be economically obtained from almost unlimited natural resources.

A still further object of the present invention is to provide a coating composition of the relatively thick protective type which comprises asphaltenes plasticized with a suitable plasticizer and thinned, where desirable, with a volatile solvent to facilitate application of the resulting composition.

These and other objects will become more apparent from the following description of my invention.

I have discovered that a protective coating composition comprising asphaltenes plasticized with a suitable plasticizer and cut back with a volatile solvent or thinner, when desirable, possesses properties equally as good as Gilsonite containing compositions and in some respects possesses properties superior to such Gilsonite containing compositions, provided the resulting protective coating composition is non-homogeneous in nature, as will be described more fully hereinafter.

Asphaltenes may be obtained from bituminous materials such as steam or vacuum-reduced residues, cracking residues, oxidized (air-blown) asphalts, catalytically oxidized (air-blown) asphalts, native (e.g. Trinidad) asphalts, crude oil containing asphalt, reduced crude oil containing asphalt as well as naturally occurring coal tars and pitches resulting from the destructive distillation of peat, lignite, shales, wood and other organic matter. In view of the many commonly occurring products from which asphaltenes may be obtained, their raw material supply is almost unlimited.

Asphaltenes may be obtained from these bituminous materials by a number of methods. For example, when asphalt is thoroughly mixed with normal pentane, isopentane, normal hexane, petroleum ether or certain other solvents, the undissolved portions settling out are classified as asphaltenes and the soluble part as a mixture of resinous and oily materials, sometimes referred to as petrolenes. Since the amount of material which settles out varies somewhat with these solvents, the undissolved portion is sometimes more specifically designated as "normal pentane asphaltenes," "isopentane asphaltenes," etc. Paraffinic hydrocarbons containing from four to eight carbon atoms or mixtures thereof are the most suitable solvents for preparing asphaltenes from these bituminous materials in accordance with this method. Pentane or its equivalent petroleum ether is the preferred solvent.

For the purpose of this specification including the claims, the word "asphaltenes" includes bituminous materials or admixtures thereof of a chemical composition the same as the bituminous material constituent which is insoluble on extraction with paraffinic hydrocarbons containing from four to eight carbon atoms or admixtures thereof.

When using this method for obtaining asphaltenes, the minimum volume of solvent utilized for obtaining the asphaltenes should be about three volumes of solvent to one volume of bituminous material. The higher the solvent to bituminous material ratio is, the less the contamination of the separated products. Consequently, the maximum amount of solvent utilized is dependent upon economic practicalities. A preferred volume ratio of solvent to bituminous material is 10:1.

Typical asphaltenes have a specific gravity of 1.16, a ring and ball softening point range of 320–330° F., a needle penetration hardness at 77° F. of zero, and an average neutralization number of 0.50. They contain only a trace of mineral matter and have a solubility in carbon disulphide of above 99%. In addition, asphaltenes are of a very friable nature and possess extremely low impact resistance and ductility.

The thick protective coating compositions of the present invention comprise asphaltenes, a plasticizer for the asphaltenes and, when desirable, a thinner and/or mineral filler. In addition, it is essential that the protective coating compositions of the invention be non-homogeneous, i.e., the compositions must contain insufficient amounts of plasticizer to render the composition homogeneous as indicated by the Oliensis Spot Test. Thus, a thick protective coating composition of the present invention may be considered as being a non-homogeneous composition, as determined by the Oliensis Spot Test, comprising a plasticized asphaltene, with or without a mineral filler, and having a consistency such as to facilitate its application to a surface to be protected by any suitable conventional method, e.g., by troweling or spraying.

The Oliensis Spot Test (ASTM Proceedings, part II, vol. 33 (1933), page 715) is well known to the art and is commonly used as an index of homogeneity of bituminous products, particularly road oils and asphalts. Inasmuch as the use of the Oliensis Spot Test as an index of homogeneity is fully understood by those skilled in the art, further discussion thereof is not considered necessary for an understanding of the present invention. However, it may be mentioned that the protective coating compositions of the invention exhibit a "positive" Oliensis Spot Test and thus are non-homogeneous compositions as indicated thereby. A composition exhibiting a "negative" Oliensis Spot Test is a homogeneous composition and unsatisfactory for the purposes of the present invention.

The coating compositions of the present invention may be produced by hot blending asphaltenes with a suitable plasticizer for asphaltenes and then, when desired, cutting back the resulting blend with volatile solvent or thinner to obtain a consistency suitable for the particular method of application to be used. If desired, a mineral filler may be added after the blending step and either before or after cutting back with thinner.

The nature and amount of plasticizer used determines to a large extent the physical properties of the plasticized asphaltene. Under normal temperature conditions and where toughness, flexibility, etc., of the coating is not required, it is necessary to use only a sufficient amount of plasticizer to impart a substantial improvement in impact resistance and ductility to the asphaltenes, and to overcome their friable nature. The least amount of plasticizer that may be employed in any specific instance is dependent upon a number of factors, such as the required toughness and flexibility of the coating, the temperature conditions encountered, etc. The primary function of the plasticizer is to plasticize the asphaltenes and act as a binder for the constituents to be included in the coating composition and thereby obtain the highly beneficial properties of the asphaltenes, particularly as to hardness, toughness, resistance to weathering and chemical action, without the undesirable properties of asphaltenes when used for coating compositions, e.g., poor impact resistance and low ductility.

The upper limit for the amount of plasticizer to be used is determined by the Oliensis Spot Test in all instances, as mentioned above. Where a relatively soft, flexible asphaltic bituminous material such as vacuum reduced asphalt as obtained in usual refinery operations is the plasticizer, the amount of asphaltenes used may be as little as 25% by weight, and the amount of plasticizer may be as much as 75% by weight, based on the combined weight of asphaltenes and asphalt. Such a protective coating will have much better chemical and weather resistance than a protective coating containing vacuum reduced asphalt of a like softening point and without the added asphaltenes. Preferably, the amount of asphaltenes to be used is more than about 35% by weight and the amount of plasticizer to be used is less than about 65% by weight, based upon the combined weight of asphaltenes and plasticizer. Even better results may be obtained when the asphaltenes are used in an amount of 35 to 50% by weight and the plasticizer is used in an amount of 65 to 50% by weight, based upon the combined weight of asphaltenes and plasticizer. The protective coating compositions containing from 35 to 50% by weight asphaltenes and from 65 to 50% by weight plasticizer, based upon the combined weight of asphaltenes and plasticizer, are superior to compositions containing smaller amounts of asphaltenes and wherein the degree of non-homogeneity is not so pronounced, i.e., where the addition of a relatively small percentage of plasticizer would produce a homogeneous composition. The presence of a substantial amount of asphaltenes over that amount required to produce a non-homogeneous composition appears to result in a reinforcing effect, with the excess asphaltenes acting as an organic reinforcing agent in the protective coating composition.

In general, the non-fluid plasticizers such as semi-solid to solid asphalts having softening points in excess of 110° F. may be successfully used in higher percentages than fluid plasticizers such as bituminous materials having a softening point of less than 90° F. For example, an air blown asphalt having a softening point of 160° F. may be used in amounts up to 75% by weight, based on the combined weight of asphaltenes and asphalt, to plasticize asphaltenes having a softening point of about 350° F. and the resulting composition will have satisfactory aging properties. However, if a bituminous material having a softening point of less than 90° F. is substituted in the foregoing composition, the resulting composition will have less desirable aging properties. In some instances, a very low percent of plasticizer will be sufficient to overcome the undesirable properties of pure asphaltenes such as low impact resistance, low ductility, etc. For example, as little as 5% by weight of Paratac, a commercially available clear, viscous polyolefin marketed by the Enjay Company, Inc., imparts substantial improvement in the impact resistance and ductility of asphaltenes. This is particularly noticeable when the resulting plasticized asphaltene is thinned with a petroleum solvent having a high end point on distillation such as a dirty gas oil. Generally, the coating composition of the invention comprises from 25 to 50% by weight of asphaltenes and from 75 to 50% by weight of plasticizer, based upon the combined weight of asphaltenes and plasticizer.

In general, the plasticizers useful in practicing the present invention include the heavier distillates or oils and residues obtainable from the refining or cracking of petroleum crudes, coal tars and shale oils, as well as animal and vegetable pitches, tall oil pitches and wood oils. The organic, highly purified, essentially single compound-type organic materials such as esters, chlorinated biphenyls or polyphenyls, etc., commonly used as plasticizers may also be used in many instances but, generally, offer no particular advantage over the cheaper plasticizers mentioned above. The use of animal and vegetable pitches as the sole plasticizing agent is not normally the preferred practice as these materials contain substances having carboxylic and phenolic groups which are reactive. However, the presence of small amounts of these materials has a beneficial effect in that they serve as oxidation inhibitors and also aid in wetting of fillers, when fillers are present in the composition. Where the protective coating is to be exposed to weathering in an atmosphere essentially free of pollution, the animal and vegetable pitches give satisfactory service as the sole plasticizer.

The volatile solvents or thinners useful in practicing the present invention, in general, are those suitable solvents useful in cutting back asphaltic bituminous compositions. Examples of suitable solvents or thinners include light petroleum distillates, kerosene, gas oil, mineral spirits, etc.

Filler materials such as talc, asbestine, fine mesh mica, silica, whiting, asbestos fiber, china clay, ground cork, and wood flour may be added to the above described vehicle for the purpose of varying its properties. Thus mineral fillers may be added to increase cohesion, adhesion, durability, insulation value and resistance to abrasion. These fillers also act as barriers against attack by weather as well as attack by acid and alkali agents. In addition, varying the type and amount of filler, asphalt material and solvent used results in the production of different mastics having different spread characteristics. For example, increasing the solvent ratio thins the mastic with the result that it may be applied by a special spray, whereas decreasing the solvent ratio obtains a thicker mastic which may be applied by a trowel.

Other agents, such as certain plasticizers, for example Monsanto's "Arochlor" series, which are said to be chlorinated biphenyls and chlorinated poly-phenyls, may be added to improve low temperature resistance and fire resistance and help adhesion and weathering properties. Colored pigments may be employed to convert black mastics to colored mastics but the resulting mastics are still relatively dark because of the color of the basic constituents thereof.

The following examples will serve to illustrate the properties of the compositions of the present invention as well as the many variations in proportion of constituents that may be included in order to arrive at formulations best suited for particular applications. All compositions illustrated in the examples are non-homogeneous compositions as indicated by the Oliensis Spot Test.

Example I 150 lbs. of asphaltenes and 150 lbs. of high vacuum-reduced asphalt having a softening point (ring and ball) of 107° F. and a penetration at 77° F. of 168, were blended together at a temperature of 575° F. and cooled to 450° F. before thinning with 300 lbs. of mineral spirits. Prior to adding mineral spirits for the purpose of cutting back the above blend, it had a softening point (ring and ball) of 215 to 220° F. and penetration at 77° F. of 14 to 16.

52 lbs. of the above described vehicle was blended together in a mixer to a smooth homogeneous state with 40 lbs. of 325 mesh mica, 5 lbs. asbestos fiber (shorts), 5 lbs. 400 mesh talc, and 0.5 lb. linseed oil fatty acids.

The resulting composition was applied by special spraying equipment to the surfaces of iron and steel equipment. It required several days to reach final hardness but after drying showed excellent resistance to sagging at high temperatures (300° F.) and excellent resistance to cracking at low temperatures (0° F. or lower). It protected these surfaces from corrosive fumes and the effect of weather both at extremely high and low temperatures.

Example II 52 lbs. of the vehicle described in Example I was thoroughly blended in a mixer with 5 lbs. Arochlor 1254 of the Monsanto Chemical Company, 55 lbs. 325 mesh mica, 10 lbs. asbestos fiber (shorts), 10 lbs. 40 mesh talc, 0.5 lb. linseed oil fatty acids and 2 lbs. mineral spirits.

The coating, although possessing equally as good properties as those enumerated above in connection with the coating composition of Example I, was particularly applicable for use where extremely low temperatures were encountered.

Example III 125 lbs. of asphaltenes and 175 lbs. high-vacuum reduced asphalt having a softening point (ring and ball) of 107° F. and a penetration at 77° F. of 168, were hot blended as in Example I and after cooling 280 lbs. of mineral spirits was added thereto. Prior to cutting back with mineral spirits, the blend had a softening point (ring and ball) of 195 to 200° F. and penetration at 77° F. of 25 to 30.

52 lbs. of the above described vehicle was blended with 40 lbs. 325 mesh mica, 10 lbs. asbestos fiber (shorts), 5 lbs. 400 mesh talc, and 0.5 lb. linseed oil fatty acids.

This coating composition possessed more flexibility than the coating compositions described in Examples I and II above and would withstand more extreme variations in heat and cold.

Example IV 52 lbs. of the vehicle described in Example III above was blended with 2.5 lbs. Arochlor 1254 of the Monsanto Chemical Company, 40 lbs. 325 mesh mica, 10 lbs. asbestos fiber (shorts), 10 lbs. 400 mesh talc, and 0.5 lb. linseed oil fatty acids.

This coating composition was comparable to that described in Example III above but possessed slightly improved low temperature resistance as well as improved adhesion and weathering properties.

Example V 125 lbs. of asphaltenes having a softening point of 365° F. and 125 lbs. of a heavy asphaltic oil having a Saybold-Furol viscosity of 60 seconds at 210° F. were hot blended as in Example I and thinned with 200 lbs. of mineral spirits.

52 lbs. of the above described vehicle was blended with 30 lbs. of 325 mesh mica, 8 lbs. of asbestos fiber (shorts), 5 lbs. of 400 mesh talc and 0.5–1 lb. of linseed oil fatty acid. This coating composition possessed desirable flexibility characteristics but tended to ravel at high temperatures.

When aromatic lubrication oils were substituted for the asphaltic oil in the above coating composition, the resulting coating composition was satisfactory with respect to raveling at high temperatures.

Example VI 100 lbs. of asphaltenes having a softening point of 365° F. was plasticized with 4 lbs. of a clear viscous polyolefin and 100 lbs. of "dirty" gas oil, i.e., gas oil containing heavier components. It was noted that the polyolefin imparted tackiness to the composition.

Sufficient mineral filler such as 400 mesh talc and asbestos fiber (shorts) was added to the above composition while hot to give a mixture having the consistency of a dough. This mixture was then thinned with mineral spirits to produce a coating composition readily appliable to a surface to be protected by trowel.

The above protective coating composition is particularly characterized by improved adhesion to the surface to be protected.

Example VII 150 lbs. of asphaltenes having a softening point of 365° F. were plasticized with a mixture of vacuum reduced asphalt (120 lbs.) having a softening point (ring and ball) of 107° F. and a penetration at 77° F. of 168, and a tall oil pitch (30 lbs.) having a softening point of 85° F. and an acid number less than 50.

Sufficient mineral filler comprising a mixture of 325 mesh mica, asbestos fiber (shorts) and 400 mesh talc was added to the above composition while hot to give a mixture having the consistency of a dough. This mixture was then thinned with sufficient mineral spirits to produce a very satisfactory trowelable or sprayable protective coating composition.

The foregoing description of the present invention is for the purpose of illustration only and is not limiting to the scope of this invention which is set forth in the claims.

What is claimed is:

1. A protective coating composition comprising from 25 to 50% by weight of asphaltenes and 75 to 50% by weight of soft asphaltic bituminous material based upon the combined weight of asphaltenes and asphaltic bituminous material, the composition containing sufficient asphaltenes to render the composition non-homogeneous.

2. The composition of claim 1 wherein the composition contains a volatile solvent.

3. The composition of claim 1 wherein the composition contains a mineral filler.

4. The composition of claim 1 wherein the composition contains a mineral filler and a volatile solvent.

5. A protective coating composition comprising from 35 to 50% by weight of asphaltenes and 65 to 50% by weight of soft asphaltic bituminous material based upon the combined weight of asphaltenes and asphaltic bituminous material, the composition containing sufficient asphaltenes to render the composition non-homogeneous.

6. The composition of claim 5 wherein the composition contains a volatile solvent.

7. The composition of claim 5 wherein the composition contains a mineral filler.

8. The composition of claim 5 wherein the composition contains a mineral filler and a volatile solvent.

9. A protective coating composition comprising from 25 to 50% by weight of asphaltenes and 75 to 50% by weight of at least one plasticizer selected from the class consisting of viscous heavy petroleum distillate, heavy asphaltic oil having a Saybold-Furol viscosity of about 60 seconds and higher at 210° F., tall oil pitch and viscous polyolefin based upon the combined weight of asphaltenes and plasticizer, the composition containing sufficient asphaltenes to render the composition non-homogeneous.

10. The composition of claim 9 wherein the composition contains a volatile solvent.

11. The composition of claim 9 wherein the composition contains a mineral filler.

12. The composition of claim 9 wherein the composition contains a mineral filler and a volatile solvent.

13. A protective coating composition comprising from 25 to 50% by weight of asphaltenes and 75 to 50% by weight of viscous heavy petroleum distillate based upon the combined weight of asphaltenes and petroleum distillate, the composition containing sufficient asphaltenes to render the composition non-homogeneous.

14. The composition of claim 13 wherein the composition contains a volatile solvent.

15. The composition of claim 13 wherein the composition contains a mineral filler.

16. The composition of claim 13 wherein the composition contains a mineral filler and a volatile solvent.

17. A protective coating composition comprising from 25 to 50% by weight of asphaltenes and 75 to 50% by weight of heavy asphaltic oil having a Saybold-Furol viscosity of about 60 seconds and heigher at 210° F. based upon the combined weight of asphaltenes and asphaltic oil, the composition containing sufficient asphaltenes to render the composition non-homogeneous.

18. The composition of claim 17 wherein the composition contains a volatile solvent.

19. The composition of claim 17 wherein the composition contains a mineral filler.

20. The composition of claim 17 wherein the composition contains a mineral filler and a volatile solvent.

21. A protective coating composition comprising from 25 to 50% by weight of asphaltenes and 75 to 50% by weight of tall oil pitch based upon the combined weight of asphaltenes and tall oil pitch, the composition containing sufficient asphaltenes to render the composition non-homogeneous.

22. The composition of claim 21 wherein the composition contains a volatile solvent.

23. The composition of claim 21 wherein the composition contains a mineral filler.

24. The composition of claim 21 wherein the composition contains a mineral filler and a volatile solvent.

25. A protective coating composition comprising from 25 to 50% by weight of asphaltenes and 75 to 50% by weight of viscous polyolefin based upon the combined weight of asphaltenes and polyolefin, the composition containing sufficient asphaltenes to render the composition non-homogeneous.

26. The composition of claim 25 wherein the composition contains a volatile solvent.

27. The composition of claim 25 wherein the composition contains a mineral filler.

28. The composition of claim 25 wherein the composition contains a mineral filler and a volatile solvent.

References Cited in the file of this patent

UNITED STATES PATENTS

| | | |
|---|---|---|
| 2,366,657 | Sorem | Jan. 2, 1945 |
| 2,487,000 | Taylor et al. | Nov. 1, 1949 |
| 2,752,264 | Pickell | June 26, 1956 |
| 2,785,078 | Keating et al. | Mar. 12, 1957 |
| 2,786,775 | Wells | Mar. 26, 1957 |

FOREIGN PATENTS

| | | |
|---|---|---|
| 1,188 | Great Britain | of 1877 |
| 280,085 | Great Britain | Nov. 10, 1927 |
| 310,924 | Great Britain | Apr. 17, 1930 |
| 683,170 | Great Britain | Nov. 26, 1952 |